(12) United States Patent
Buchert

(10) Patent No.: US 7,947,858 B2
(45) Date of Patent: *May 24, 2011

(54) METHOD AND APPARATUS FOR THERMAL PROCESSING OF BIOMASS

(76) Inventor: Jürgen Buchert, Schweinfurt (DE)

(*) Notice: Subject to any disclaimer, the term of this patent is extended or adjusted under 35 U.S.C. 154(b) by 313 days.

This patent is subject to a terminal disclaimer.

(21) Appl. No.: 12/123,863

(22) Filed: May 20, 2008

(65) Prior Publication Data

US 2009/0223859 A1    Sep. 10, 2009

(30) Foreign Application Priority Data

Mar. 8, 2008  (DE) .......................... 10 2008 013 241

(51) Int. Cl.
*C07C 1/00* (2006.01)
*B01J 8/08* (2006.01)
(52) U.S. Cl. ........ 585/240; 585/241; 585/242; 422/215; 422/224; 202/96; 366/182.2
(58) Field of Classification Search .................. 422/215, 422/224; 585/241, 242, 240; 202/96, 112; 366/182.2
See application file for complete search history.

(56) References Cited

U.S. PATENT DOCUMENTS 7,473,348 B2 * 1/2009 Koch ............................ 208/113
2007/0131585 A1    6/2007 Koch

FOREIGN PATENT DOCUMENTS

DE    102004038220    3/2006

* cited by examiner

*Primary Examiner* — N. Bhat
(74) *Attorney, Agent, or Firm* — Henry M. Feiereisen; Ursula B. Day

(57) ABSTRACT

In a method and apparatus for thermal processing of catalytically active biomass, the biomass is subjected in a receiving tank to a cracking temperature to undergo a cracking reaction. The biomass is transferred to a mixer pump to produce a reaction mixture which is directed into an outgassing chamber of an intermediate tank to produce an outgassed fraction and a non-outgassed liquid fraction. The outgassed fraction to produce fuel is cooled down, and a first portion of the non-outgassed liquid fraction is returned and subjected again to the cracking temperature in the receiving tank. A second portion of the non-outgassed liquid fraction is conducted in a bypass to the outgassing chamber of the intermediate tank for outgassing while fresh biomass is added. Residual matter settling in the intermediate tank is periodically removed.

29 Claims, 1 Drawing Sheet

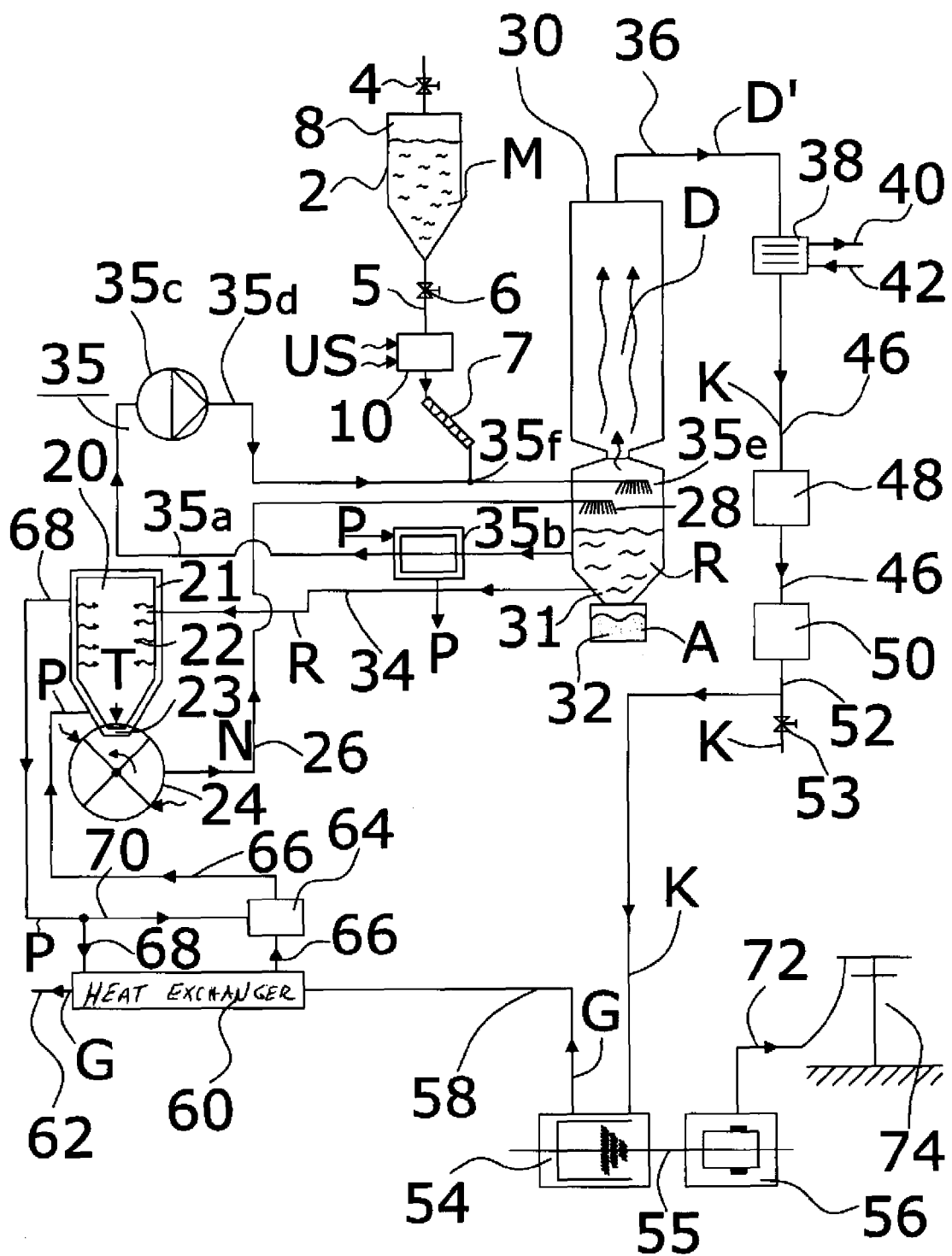

METHOD AND APPARATUS FOR THERMAL PROCESSING OF BIOMASS

CROSS-REFERENCES TO RELATED APPLICATIONS

This application claims the priority of German Patent Application, Serial No. 10 2008 013 241.1, filed Mar. 8, 2008, pursuant to 35 U.S.C. 119(a)-(d), the content of which is incorporated herein by reference in its entirety as if fully set forth herein.

BACKGROUND OF THE INVENTION

The present invention relates to a method and apparatus for thermal processing of biomass.

Nothing in the following discussion of the state of the art is to be construed as an admission of prior art.

To ensure clarity, it is necessary to establish the definition of several important terms and expressions that will be used throughout this disclosure.

The term "biomass" is used here in a generic sense and may refer to a mixture of relatively dry "biological residue" and a relatively dry catalytically active bio-substance ("biocatalyst"). Biological residue as well as biocatalyst, alone or together, should have a moisture content of not more than 2-5%. Both substances may predominantly involve waste products obtained in large amounts in agriculture. Thus, the present invention is also directed to the disposal of biological waste while producing an energy carrier (fuel).

The term "biological residue" involves primarily wood residues (e.g. sawdust), leaves, rapeseed cake, sugar beet residues, husks obtained during beer brewing or liquor production, solids from olive oil production, animal meal, cellulose from paper production, press cake from feedstock production for animals, straw from wheat, barley or other crop, or other bio-substances, such as various grains, corn, etc.

The term "biocatalyst" involves predominantly bio-substances which take up a certain amount of catalytically active elements, minerals or other compositions present in the ground, as they grow. It has been shown that, e.g., a certain content of inorganic substances have a catalytic effect on biological residues. These types of bio-substances with mineral constituents involve, e.g., rapeseed roots, rapeseed straw, or sugar beet residues (pressed sugar beets).

The method according to the present invention is applicable for example to a mixture of sugar beet residues (presumably biological residue), on one hand, and sugar beet residues (presumably biocatalyst), on the other hand, or to a mixture of rapeseed cake (presumably biological residue) on one hand, and rapeseed straw (presumably biocatalyst), on the other hand.

It would be desirable and advantageous to provide an improved method and apparatus for processing biomass to obviate prior art shortcomings.

SUMMARY OF THE INVENTION

According to one aspect of the present invention, a method of thermal processing of catalytically active biomass includes the steps of subjecting a catalytically active biomass in a receiving tank to a cracking temperature to undergo a cracking reaction, transferring the biomass to produce a reaction mixture, directing the reaction mixture into an outgassing chamber of an intermediate tank to produce an outgassed fraction and a non-outgassed liquid fraction, cooling down the outgassed fraction to produce fuel, returning a first portion of the non-outgassed liquid fraction and subjecting it again to the cracking temperature in the receiving tank, and conducting a second portion of the non-outgassed liquid fraction in a bypass to the outgassing chamber of the intermediate tank for outgassing while fresh biomass is added, and periodically removing from the intermediate tank settled residual matter.

The present invention is based on the recognition to use a catalytically active biomass to trigger a catalytic process when exposed to heat and thereby cause a substantial decomposition of organic substances in the biological residue as well as biocatalyst. The thermal and catalytic effect depends on the biocatalyst composition which may greatly vary. Still, it has been found that the biological residue and the biocatalyst can react such that their organic substances are catalytically cracked. Only solid residue remains which can be stored or used as high-quality residue.

According to another feature of the present invention, the biomass may be transferred to a mixer pump. There it may be subjected to a further cracking reaction in the mixer pump.

According to another feature of the present invention, the cracking temperature may range from 250° C. to 380° C.

According to another feature of the present invention, the fuel may be dewatered and/or desulphurized. Fuel can then be used for drive motors, e.g. diesel motors. It is also possible to use fuel for generating electricity, for example with the aid of a turbogenerator (combination of turbine and generator). Fuel may also be combusted in a turbine for driving a generator, while exhaust gas from the turbine can be used for generating the cracking temperature. This is financially beneficial. The exhaust gas may thus be used for heat introduction in a thermal oil circulation for producing the cracking temperature. Thermal oil may hereby be supplied to the receiving tank and/or a post-heating unit.

Normally, the proportion of biological residue is greater than the proportion of biocatalyst.

The method according to the present invention is thus able to dispose in addition to biocatalyst also biological residue which both are difficult to recycle. The proportion of fuel being generated is substantial, while the proportion of gas and low-boiling fractions is relatively small. The energy content of fuel can be exploited for generating electricity and/or heat for a wide range of applications and also for operating motors.

According to another aspect of the present invention, an apparatus for thermal processing of catalytically active biomass includes a reservoir for accepting a biomass mixture, a transport device associated to an outlet of the reservoir, a receiving tank for heating the mixture to a cracking temperature to thereby trigger a catalytic cracking reaction, a mixing pump disposed downstream of the receiving tank to receive the mixture from the receiving tank, an intermediate tank having an outgassing chamber, an outgassing device accommodated in the intermediate tank, a distillation column disposed downstream of the intermediate tank, a feed line fluidly connecting an outlet of the mixer pump to the outgassing device, a return line extending between a lower part of the intermediate tank and the receiving tank for returning a non-outgassed fraction of the mixture, a condenser fluidly connected to a top of the distillation column for cooling an outgassed vaporized fraction of the mixture to thereby produce fuel, said condenser having an outlet for discharge of the fuel, and a bypass having a bypass pump and extending between the lower part of the intermediate tank and the outgassing chamber of the intermediate tank, said bypass having a port in communication with an outlet of the transport device for introduction of biomass.

According to another feature of the present invention, a processing device may be disposed downstream of the outlet of the condenser, for dewatering the fuel. Suitably, a storage tank may be fluidly connected to the condenser for collecting the purified product.

According to another feature of the present invention, the receiving tank may have a double-jacketed configuration for circulation of hot thermal oil. Suitably, the thermal oil has a temperature which is adjusted to closely reach the cracking temperature. The receiving tank may hereby be part of a circulation system for the thermal oil, with the circulation system further including a heat exchanger.

According to another feature of the present invention, the bypass may include a post-heating unit.

According to another feature of the present invention, produced fuel may be supplied from the condenser to a turbine. Exhausts from the turbine can be conducted to the heat exchanger for utilizing the energy content. The turbine may also be operatively connected to a generator which may be connected to the public power grid.

According to another feature of the present invention, an ultrasound device may be disposed between the reservoir and the transport device for exposing the biomass mixture to ultrasound before undergoing the cracking reaction. The biomass mixture may hereby include biocatalyst and/or biological residue

BRIEF DESCRIPTION OF THE DRAWING

Other features and advantages of the present invention will be more readily apparent upon reading the following description of currently preferred exemplified embodiments of the invention with reference to the accompanying drawing, in which the sole FIGURE shows a schematic illustration of one embodiment of an apparatus for thermal processing of biomass in accordance with the present invention.

DETAILED DESCRIPTION OF PREFERRED EMBODIMENTS

The depicted embodiment is to be understood as illustrative of the invention and not as limiting in any way. It should also be understood that the FIGURE is not necessarily to scale. Details which are not necessary for an understanding of the present invention or which render other details difficult to perceive may have been omitted.

Turning now to the sole FIGURE, there is shown, by way of example, a schematic illustration of one embodiment of an apparatus for thermal processing of biomass in accordance with the present invention. As will be described hereinafter, this example of an apparatus according to the present invention involves the production of fuel for supply to a turbine generator by which the fuel is converted into electric energy for feeding into a public power grid, while at the same time utilizing the energy content of turbine exhausts for the process according to the invention. Of course, fuel may also be used for driving purposes.

The apparatus includes a reservoir 2 having a closeable inlet 4 for accepting finely particulate and rather dry and catalytically active biomass M. The biomass M is obtained in agriculture as waste product and may be a mixture to contain about 90% rapeseed cake as biological residue and about 10% of rapeseed straw as biocatalyst for producing as much diesel oil based fuel K as possible. Water content should be low, at most 5%. Of course, the biomass M may have a different composition, i.e. based on a different substance or substance combinations of organic substances as set forth above.

Arranged at the lower end of the reservoir 2 is a metering valve 6, e.g. a controllable supply unit, which is connected to a transport device 7 or worm for routing the biomass M from the reservoir 2 along a conduit 5. Inside the reservoir 2 above the biomass level is a nitrogen cushion 8 or a cushion of different inert gas under pressure. This prevents air, i.e. oxygen, from penetrating the apparatus. The introduction of catalytically active biomass M into the apparatus will be described furtherbelow.

Reference numeral 10 designates an ultrasonic device which may, optionally, be disposed in or at the conduit 5 for exposing the biomass M to ultrasonic radiation US, for example from opposite sides, to render the following cracking process more effective and efficient.

Of course, the catalytically active biomass M may be made from a mixture of biocatalyst and inorganic residue.

The apparatus further includes a receiving tank 20 having a double-jacketed configuration so as to define a passageway 21 which is part of a thermal oil heat circulation for circulating thermal oil P and heating the biomass M to a cracking temperature T ranging from about 250° C. to about 380° C. Introduction of heat is indicated by arrows 22. An example of thermal oil includes Meganol 420. As a result of the elevated temperature T in the receiving tank 20, organic molecules of the biomass M are subjected to a thermal cracking process. Substances in the biomass mixture M, in particular mineral fractions of the biocatalyst, act hereby as catalyst for the cracking reaction. After undergoing the thermal cracking process, a liquid reaction mixture N, in which the previously present substances have been broken down to a large extent as a consequence of the catalytic and thermal cracking process, exits the tank 20 via an outlet 23.

Connected to the lower end of the receiving tank 20 is a mixer pump 24 which subjects the liquid reaction mixture N from the receiving tank 20 to a further cracking reaction. A specific construction of a suitable mixer pump for incorporation in the apparatus according to the present invention is fully described in U.S. Patent Application Publication No. US 2007/0131585 A1, the entire specification and drawings of which are expressly incorporated herein by reference. The mixer pump 24 rotates counterclockwise, as indicated by the curved arrow, and has two functions: On one hand, the mixer pump 24 assists a thorough mixing of the reaction mixture N exiting the tank 20 and resulting from the biomass M, and on the other hand, the mixer pump 24 effects a shearing of particles in the reaction mixture N so that the surface is enlarged and efficiency increased.

The mixer pump 24 may be constructed as a heating unit. The added heating through shearing and/or friction is indicated by the wavy arrows.

The mixer pump 24 is connected to a feed line 26 which is part of a reaction circulation and leads to an outgassing device 28 which is accommodated in an upper region of an outgassing chamber of an intermediate tank 31 and provided to separate water vapor and organic vapor D from a non-outgassed liquid residue R of the reaction mixture N. The outgassing chamber of the intermediate tank 31 is arranged anteriorly of a distillation column 30 which receives the water vapor and the organic vapor D. The liquid residue R collects in a lower portion of the intermediate tank 31 and eventually settles upon the bottom of the intermediate tank 31 as residual matter A for discharge in a collecting vessel 32 and ultimate storage or optional use as combustible. Extending from the lower portion of the intermediate tank 31 is a conduit 34 for feeding a first portion of the liquid residues R that have not been distilled as of yet back to the receiving tank 20. The conduit 34 of the intermediate tank 31 thus represents a return line of the reaction circulation.

The mixer pump 24 thus repeatedly feeds liquid reaction mixture N, obtained from the biomass M, in the reaction circulation comprised of mixer pump 24, feed line 26, outgassing device 28, intermediate tank 31, conduit 34, receiving tank 20, until substantially all organic substances have been thermally cracked and conducted upwards and until residual matter A has been separated out. In order to initiate the reaction circulation, a high-boiling product should be introduced from the process or thermal oil should be introduced. In other words, the reaction process R commences when the product R from the intermediate tank 31 is in hot liquid form or when the thermal oil is added to the mixture N via the conduit 34.

To ensure a continuous operation, small amounts of biomass M are transferred by the transport device 7 to a bypass 35. The presence of the bypass 35 is instrumental to prevent or at least reduce foam formation in the intermediate tank 31. The bypass 35 includes a return line 35 which extends from the lower part of the intermediate tank 31, an optional double-jacketed post-heating unit 35b which defines a passageway fro circulation of heated thermal oil P, a bypass pump 35, and a feed line 35d which ends in an outgassing device 35e disposed in the upper part of the intermediate tank 31 above the level of the product R, i.e. in the outgassing chamber. The outlet of the transport device 7 connects to a port 35f of the feed line 35d. The volume introduced per time unit from the transport device 7 is substantially smaller than the volume transported by the bypass pump 35c per time unit and amounts to only 5%, for example.

A second portion of the residue R is drawn via the return line 35a by the pump 35c. Biomass M, which is still relatively cold, is fed via the port 35f and heated by the residue R flowing in the feed line 35d to an elevated temperature, even up to the reaction temperature T. All water is hereby converted into water vapor which flows upwards in the intermediate tank 31 towards the distillation column 30 and then to the condenser 38 for subsequent discharge together with fuel K and optional separation from the fuel K by means of a centrifuge, for example.

Low-boiling organic vapor D' is separated within the distillation column from atop the distillation column 30 and drained through a drain line 36 which connects to a condenser 38. The outgassed organic vapor fraction D' is cooled down in the condenser 38 and discharged in the form of liquid fuel K through a fuel drain line 46. The fuel K maybe similar, e.g., to diesel oil. Reference numerals 40 and 42 designate coolant lines of the condenser 38, with coolant line 40 constituting a coolant feed line and coolant line 42 constituting a coolant drain line. The fuel drain line 46 connects the condenser 38 with a processing device 48 for processing the fuel K, e.g. for dewatering the fuel K and removal of water, or for desulphurization, and subsequently to a downstream storage tank 50. The storage tank 50 has an outlet line 52 via which the fuel K can be optionally supplied to a fuel-operated system, for example a drive motor.

In the non-limiting example of the FIGURE, the fuel-operated system involves a turbine generator which includes a turbine 54 and an electric generator 56 which is operatively connected to the turbine 54 by a shaft 55. The turbine generator is used for generating electricity as well as for generating the cracking temperature T via the thermal oil circulation. Fuel K is conducted via the fuel outlet line 52 from the storage tank 50 to the turbine 54 and combusted to thereby drive the electric generator 56. As the fuel K is combusted in the turbine 54, exhaust gas G is produced which is conducted via an exhaust line 58 to a heat exchanger 60 and cooled down as it interacts with thermal oil P of the thermal oil circulation. As a result, thermal oil P is heated up and returned via a feed line 66 to the passageway 21 of the receiving tank 20 for heating the mixture M. The cooled down exhaust gas G leaves the heat exchanger 60 via outlet line 62 and may also be used for drying the introduced biomass.

The heat exchanger 60 is thus also part of the thermal oil circulation, shown only schematically A temperature controller 64 maintains the thermal oil P in the feed line 66 at a predefined temperature close to the cracking temperature T, e.g. to 350° C. As it enters the passageway 21 and flows there through, the thermal oil P cools slightly and is returned via a return line 68 to the heat exchanger 60 where the incoming exhaust gas G heats the thermal oil P. As an alternative, and in dependence on the temperature adjustment and actual temperature, the temperature controller 64 may control the flow of thermal oil P in such a way that the thermal oil P sidesteps the heat exchanger 60 and flows via a bypass line 70 back to the feed line 66.

As further shown in the FIGURE, the electric generator 56 feeds electric energy via power lines 72 to the public power grid which is symbolized here by a power pole 74. Of course, the power lines 72 may also be electrically connected to a different consumer.

Using only biocatalyst rapeseed straw in the absence of rapeseed cake would result in the development of much gas G and low-boiling product but in little production of diesel oil like fuel. The same is true when using only sugar beet residue as biocatalyst. Therefore, rapeseed straw or sugar beet residue should be mixed with, e.g., crop waste, e.g. corn waste, or with cellulose to produce the biomass mixture M. The apparatus according to the invention is thus able to produce fuel and/or energy from the organic components, biocatalyst and biological residues as starting substances, which together form the catalytically active biomass M. This is realized while reducing mass at the same time. As a result, the apparatus according to the present invention is operative in the absence of addition of external catalysts.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method of thermal processing of biomass, comprising the steps of:
  subjecting a biomass in a receiving tank to a cracking temperature to undergo a cracking reaction;
  transferring the biomass to a mixer pump to produce a reaction mixture;
  directing the reaction mixture into a chamber of an intermediate tank to produce a gaseous fraction and a liquid fraction;
  cooling down the gaseous fraction to produce fuel;
  returning a first portion of the liquid fraction and subjecting it again to the cracking temperature in the receiving tank;
  conducting a second portion of the liquid fraction in a bypass to the chamber of the intermediate tank for separating a further gaseous fraction while fresh biomass is added; and periodically removing from the intermediate tank settled residual matter.

2. The method of claim 1, wherein the transferring step includes the step of subjecting the biomass to a further cracking reaction in the mixer pump.

3. The method of claim 1, wherein the cracking temperature is in the range of about 250° C. to about 380° C.

4. The method of claim 1, further comprising the step of dewatering the fuel.

5. The method of claim 1, further comprising the step of feeding the fuel to operate a turbogenerator constructed for generating electricity.

6. The method of claim 1, further comprising the steps of combusting the fuel in a turbine, and utilizing exhaust gas from the turbine for generating the cracking temperature.

7. The method of claim 6, wherein the exhaust gas of the turbine is used for drying fresh biomass.

8. The method of claim 6, wherein the exhaust gas of the turbine is used for heat introduction in a thermal oil circulation which produces the cracking temperature.

9. The method of claim 1, wherein the biomass is a biological waste material.

10. The method of claim 9, wherein the biological waste material is a residue of a material selected from the group consisting of sugar beet, rapeseed, and wood.

11. The method of claim 1, further comprising the step of subjecting the biomass to ultrasound.

12. The method of claim 1, further comprising the step of heating the second portion of the liquid fraction.

13. Apparatus for thermal processing of biomass, comprising:
   a reservoir for accepting a biomass mixture;
   a transport device associated to an outlet of the reservoir;
   a receiving tank for heating the mixture to a cracking temperature to thereby trigger a catalytic cracking reaction;
   a mixing pump disposed downstream of the receiving tank to receive the mixture from the receiving tank;
   an intermediate tank having an outgassing chamber;
   an outgassing device accommodated in the intermediate tank;
   a distillation column disposed downstream of the intermediate tank;
   a feed line fluidly connecting an outlet of the mixer pump to the outgassing device;
   a return line extending between a lower part of the intermediate tank and the receiving tank for returning a non-outgassed fraction of the mixture;
   a condenser fluidly connected to a top of the distillation column for cooling an outgassed vaporized fraction of the mixture to thereby produce fuel, said condenser having an outlet for discharge of the fuel; and
   a bypass having a bypass pump and extending between the lower part of the intermediate tank and the outgassing chamber of the intermediate tank, said bypass having a port in communication with an outlet of the transport device for introduction of biomass.

14. The apparatus of claim 13, further comprising a processing device, disposed downstream of the outlet of the condenser, for dewatering the fuel.

15. The apparatus of claim 14, wherein the processing device is a centrifuge.

16. The apparatus of claim 13, further comprising a storage tank fluidly connected to the condenser for receiving fuel.

17. The apparatus of claim 13, wherein the receiving tank has a double-jacketed configuration for circulation of hot thermal oil.

18. The apparatus of claim 17, wherein the thermal oil has a temperature adjusted to closely reach the cracking temperature.

19. The apparatus of claim 17, wherein the receiving tank is part of a circulation system for the thermal oil, said circulation system further including a heat exchanger.

20. The apparatus of claim 16, further comprising a turbine receiving fuel from the storage tank.

21. The apparatus of claim 20, wherein the receiving tank is part of a circulation system for the thermal oil, said circulation system further including a heat exchanger, said turbine producing exhaust gas for conduction to the heat exchanger.

22. The apparatus of claim 20, further comprising a generator operatively connected to the turbine.

23. The apparatus of claim 22, wherein the generator is connected to the public power grid.

24. The apparatus of claim 13, further comprising an ultrasound device disposed between the reservoir and the transport device for exposing the biomass mixture to ultrasound before undergoing the cracking reaction.

25. The apparatus of claim 13, wherein the biomass mixture includes at least one material selected from the group consisting of biocatalyst and biological residue.

26. The apparatus of claim 13, further comprising a heating unit disposed in the bypass.

27. The apparatus of claim 13, wherein the bypass pump is disposed upstream of the port.

28. The apparatus of claim 26, wherein the heating unit communicates with a circulation system of hot thermal oil for receiving heat energy from the thermal oil.

29. The apparatus of claim 13, wherein the mixing pump is formed as a heating device for generating substantially the cracking temperature and for subjecting the mixture to a further cracking reaction.

* * * * *